United States Patent [19]

Takamura et al.

[11] 4,437,147
[45] Mar. 13, 1984

[54] RECTIFIER CIRCUIT

[75] Inventors: Yoshio Takamura, Yokahama; Akira Nakajima, Yokosuka, both of Japan

[73] Assignee: Tokyo Shibaura Denki Kabushiki Kaisha, Kawasaki, Japan

[21] Appl. No.: 379,042

[22] Filed: May 17, 1982

[30] Foreign Application Priority Data

| May 19, 1981 | [JP] | Japan | 56-75178 |
| May 19, 1981 | [JP] | Japan | 56-75179 |
| May 19, 1981 | [JP] | Japan | 56-75180 |
| May 19, 1981 | [JP] | Japan | 56-75181 |
| May 19, 1981 | [JP] | Japan | 56-75182 |
| May 19, 1981 | [JP] | Japan | 56-75183 |

[51] Int. Cl.³ .................................................. H02M 7/10
[52] U.S. Cl. ............................................................ 363/61
[58] Field of Search ................................... 363/59–61

[56] References Cited

U.S. PATENT DOCUMENTS 4,109,306 8/1978 Mason ..................................... 363/61

OTHER PUBLICATIONS

"Quad Symmetrical Supply", Anon, Elektor (English), vol. 2, No. 7–8, p. 765, Jul.–Aug. 1976.

Primary Examiner—William M. Shoop
Attorney, Agent, or Firm—Cushman, Darby & Cushman

[57] ABSTRACT

A rectifier circuit comprises a transformer having a primary winding connected to an an AC power source, a first diode whose anode is connected through a first capacitor to one end of a secondar winding of the transformer, a second diode whose cathode is connected through the first capacitor to the one end of the secondary winding, and a second capacitor connected between the cathode of the first diode and the anode of the second diode. A third capacitor is connected between the anode of the second diode and the other end of the secondary winding, and a third diode is connected between the anode of the second diode and the second capacitor and in the same rectifying direction as those of the first and second diodes, and the tap of the secondary winding is grounded.

5 Claims, 6 Drawing Figures

RECTIFIER CIRCUIT

BACKGROUND OF THE INVENTION

The present invention relates to a rectifier circuit through which DC output voltage several times higher than AC input voltage can be obtained.

With the rectifier circuit for transforming AC input voltage to high DC voltage of several tens kV, it is not always easy from the viewpoint of design and manufacture of transformer to obtain high voltage. Where the rectifier is made small in size, it is impossible to shorten the dielectric distance between the primary and secondary windings. Therefore, the magnetic coupling between the two windings is weak and the high voltage can not be effectively generated at the secondary side. DC dielectric strength can be substantially improved by considering only the dielectric strength of insulator, but AC dielectric strength has not been improved enough because the life breakdown of insulator due to corona discharge must be considered. Accordingly, the design free from corona discharge is needed for this purpose. It is particularly troublesome and provides no excellent result when a solid insulator is employed.

SUMMARY OF THE INVENTION

The object of the present invention is to provide a rectifier circuit having a transformer small-sized and excellent in dielectric strength and through which high DC voltage several times higher than AC input voltage can be obtained.

This object can be achieved by a rectifier circuit comprising a transformer whose primary winding is connected to an AC signal source, a first capacitor whose one end is connected to one end of a secondary winding of the transformer, first and second rectifiers whose one ends are connected to the other end of the first capacitor and which are connected with each other in a same rectifying direction, a second capacitor whose one end is connected to the other end of the first rectifier, a third rectifier connected between the other ends of the second rectifier and second capacitor and in the same rectifying direction as that of the second rectifier, a third capacitor connected between the other ends of the second rectifier and secondary winding of the transformer, and a DC voltage terminal connected to a tap of the secondary winding of the transformer.

DETAILED DESCRIPTION OF THE PREFERRED EMBODIMENTS

Figure 1:
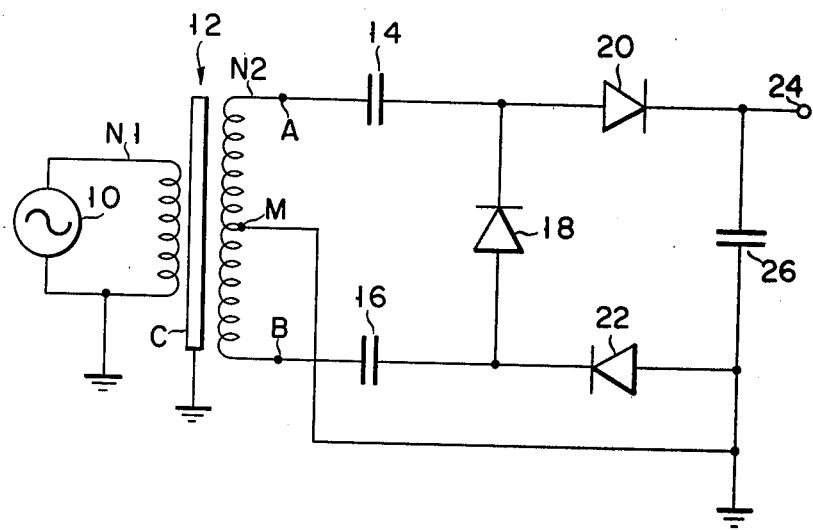
FIG. 1 is a circuit diagram showing an embodiment of a rectifier circuit according to the present invention.

An embodiment of rectifier circuit according to the present invention will be described referring to the drawings. In FIG. 1, an AC power source 10 is connected to a primary winding N1 of a transformer 12. Output voltage of AC power source 10 is several tens volts. The primary winding N1 and a core C of the transformer 12 are grounded. Both ends A and B of a secondary winding N2 of the transformer 12 are connected to the cathode and anode of a diode 18 through capacitors 14 and 16, respectively. The cathode of diode 18 is also connected to the anode of a diode 20 while the anode of diode 18 to the cathode of a diode 22. Namely, the diodes 22, 18 and 20 are connected with one another in a same rectifying direction. The cathode of diode 20 is connected to an output terminal 24 while to the anode of diode 22 through a capacitor 26. A tap M (an intermediate point in this case) of the secondary winding N2 of transformer 12 and the anode of diode 22 are grounded.

The operation of the first embodiment will be described. It is assumed that voltage 2E(V), whose polarity is positive on the side of terminal A and negative on the side of terminal B, is excited through the secondary winding N2 of transformer 12. Since the tap M is the intermediate point of the secondary winding N2 and grounded, the terminal A has voltage $+E$ and the terminal B voltage $-E$ relative to the tap M. Therefore, the diode 22 is made conductive and current flows through the tap M, diode 22, capacitor 16 and terminal B to thereby charge the capacitor 16 to E(V). The capacitor 16 is positive in polarity on the side of diode 22 and negative on the side of terminal B in this case. When the polarity of the voltage of secondary winding N2 is reversed in such a way that it becomes negative on the side of terminal A and positive on the side of terminal B, the diode 18 is made conductive. Therefore, the capacitor 14 is positive in polarity on the side of diode 18 and negative on the side of terminal A and charged to 3E(V), which is the sum between the voltage 2E of secondary winding N2 and the voltage E of capacitor 16. When the polarity of secondary winding N2 is further reversed, the diode 20 is made conductive. The capacitor 26 becomes positive in polarity on the side of diode 20 and is charged to 4E(V), which is the sum of the voltage 3E of capacitor 14 and the voltage E between the tap M of secondary winding N2 and the terminal A. The capacitor 16 becomes positive, as described above, on the side of diode 22 and is charged to E(V) at the same time. Charge of the capacitor 14 to 3E(V) and charge of the capacitor 26 to 4E(V) are thereafter repeated every time when the polarity of secondary winding N2 is reversed. As the result, DC voltage of 4E(V) is generated from the output terminal 24. Since this output voltage is two times voltage of the secondary winding N2, the secondary side circuit of the transformer is a voltage doubler circuit.

This first embodiment enables the following effects to be achieved. Since the tap M of the secondary winding N2 of transformer 12 is grounded and connected to the one end B of secondary winding N2 through the diode 22 and capacitor 16, the potential difference between the primary and secondary windings of transformer 12 and between the core and the secondary winding is only E(V). Namely, the dielectric strength of the transformer 12 may be a quarter of the output voltage. When output voltage of 20 kV is to be obtained, for example, the dielectric strength of transformer 12 may be 5 kV. Output voltage is not applied to the transformer 12 but output voltage is divided to 3E and E(V) and charged in the capacitors 14 and 16, respectively, thus making it unnecessary to make the dielectric strength of transformer 12 high. As the result, the primary and secondary windings may be arranged close to each other and the design free from the corona discharge may not be taken into consideration, thus enabling apparatus to be made small-sized and easy to handle. The capacitor 14 is required to have a dielectric strength of 3E(V) which is one and half times that of the transformer 12, but there is no problem since the dielectric strength of the capacitor can be easily made high. The dividing ratio of the output voltage relative to the capacitors 14 and 16 can be varied depending upon the position of the tap M of the secondary winding N2 of transformer 12. The dielectric strength of the transformer 12 may be the smallest when the tap M is on the intermediate point of the secondary winding N2. Namely, the position of tap M is not limited to the intermediate point of the secondary winding N2 but may be on an optional point thereof. In addition, the tap M is not necessarily connected to the anode of diode 22 but may be connected to the cathode of diode 20. In this case, however, the cathode of diode 20 is grounded, the output terminal 24 is connected to the anode of diode 22, and output voltage becomes negative in polarity.

Figure 2:
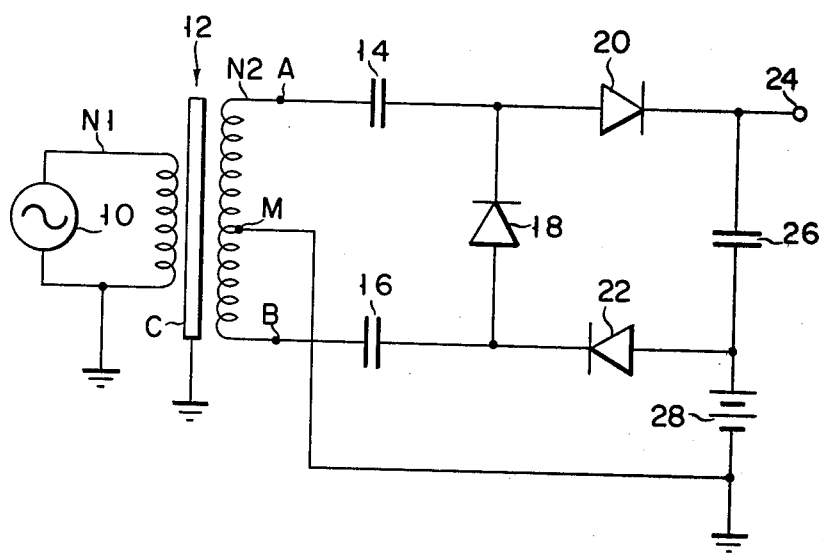
FIG. 2 is a circuit diagram showing a variation of the embodiment shown in FIG. 1.

The first embodiment can be varied as shown in FIG. 2. This variation is different from the arrangement shown in FIG. 1 only in that a DC power source 28 is inserted between the anode of diode 22 and the ground terminal. The operation of this variation is almost same as that of the first embodiment shown in FIG. 1 but different in that charged voltage of each of capacitors becomes higher by a value corresponding to the DC power source 28. According to this invention, all of the superposed is charged in the capacitors 14, 16 and 26 and not applied to the secondary winding N2 of transformer 12 even when DC voltage is superposed on the output of the transformer 12, thus making it unnecessary to enhance the dielectric strength of the transformer. Therefore, it is possible to provide any arbitrary voltage as well as voltages which are integral multiples of that of the secondary winding N2.

Figure 3:
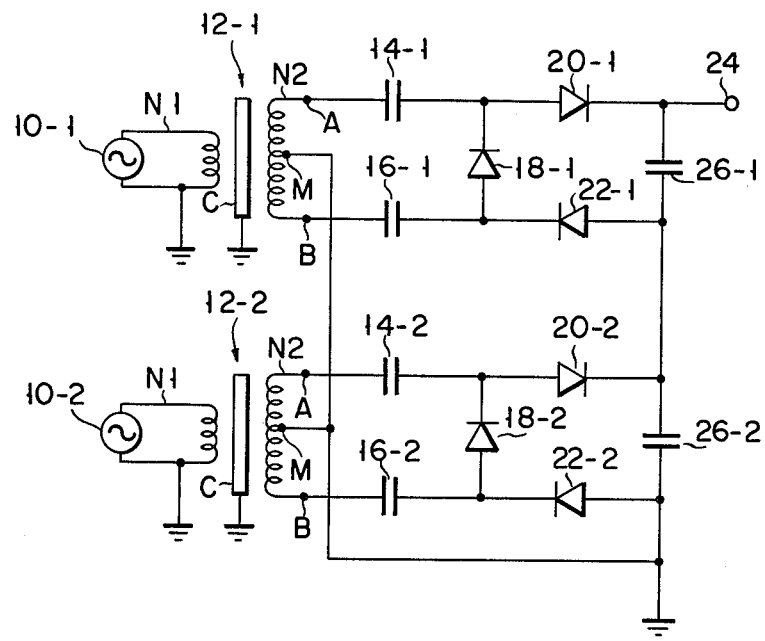
FIG. 3 is a circuit diagram showing a second variation of the embodiment shown in FIG. 1.

FIG. 3 is a circuit diagram showing a second variation of the first embodiment. This second variation employs another rectifier circuit instead of the DC power source 28 in the first variation shown in FIG. 2. Output capacitors 26-1 and 26-2 of first and second rectifier circuits are connected in series between an output terminal 24 and a ground terminal. To describe the operation of this second variation, it is assumed that 2E1(V) and 2E2(V) are excited through secondary windings N2 of first and second transformers 12-1 and 12-2, respectively. It is also assumed that the position of a tap M is on the intermediate point of the secondary winding N2. Every time when the voltage through the secondary winding N2 of second transformer 12-2 is reversed in polarity, the steps in which the capacitor 16-2 is charged to E2(V), the capacitor 14-2 to 3E2(V), and the respective capacitor 26-2 and 16-2 to 4E2(V) and E2(V) are repeated as described above, so that the capacitor 26-2 continues to be charged to 4E2(V). Namely, this 4E2(V) corresponds to DC voltage in the first variation shown in FIG. 2 and other operation is same as that of the first variation. And 4E2+4E1(V) is generated through the output terminal 24, Frequencies of the first and second AC power sources 10-1 and 10-2 may be different from each other. Output voltages of two rectifier circuits are superposed in the second variation but they may be three or more.

Figure 4:
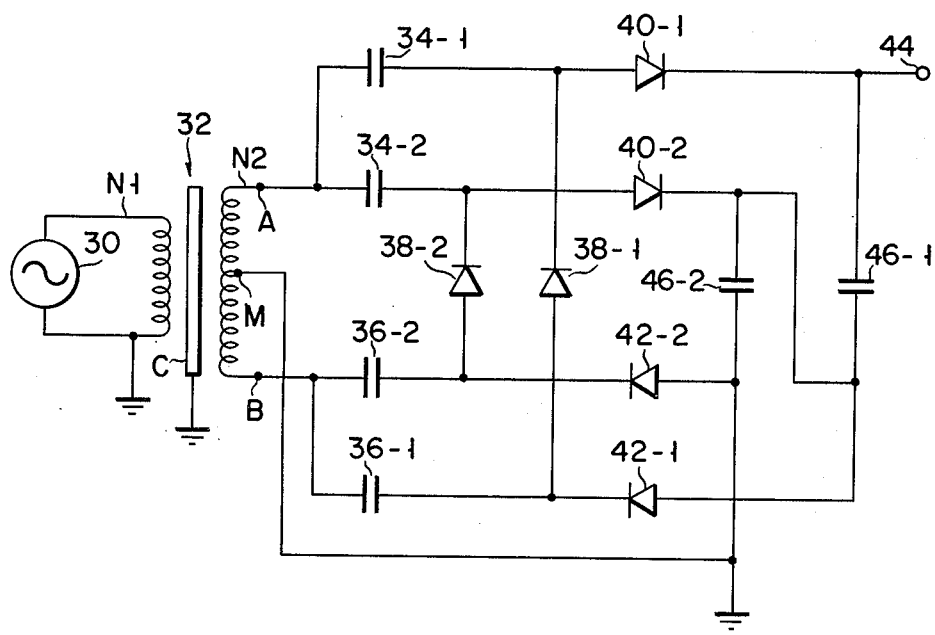
FIG. 4 is a circuit diagram showing a second embodiment of a rectifier circuit according to the present invention.

FIG. 4 is a circuit diagram showing a second embodiment of a rectifier circuit according to the present invention. The second embodiment is a voltage quadrupler circuit, in contrast to the first embodiment which is a voltage doubler circuit. An AC power source 30 is connected to a primary winding N1 of a transformer 32. The primary winding N1 and a core C of the transformer 32 are grounded. One end A of a secondary winding N2 of the transformer 32 is connected to the cathodes of diodes 38-1 and 38-2 through capacitors 34-1 and 34-2, respectively. The other end B of the secondary winding N2 is connected to the anodes of diodes 38-1 and 38-2 through capacitors 36-1 and 36-2, respectively. The cathode and anode of diode 38-1 are connected to the anode of a diode 40-1 and the cathode of a diode 42-1, respectively. The cathode and anode of diode 38-2 are connected to the anode of a diode 40-2 and the cathode of a diode 42-2, respectively. The cathode of diode 40-1 is connected to an output terminal 44, to the anode of diode 42-1 through a capacitor 46-1, and to the anode of diode 42-2 through capacitors 46-1 and 46-2 in series. The cathode of diode 40-2 is connected to the node between the capacitors 46-1 and 46-2. The anode of diode 42-2 is grounded. A tap M of the secondary winding N2 is also grounded. As described above, the second embodiment comprises two voltage doubler circuits of FIG. 1 connected parallel to the secondary winding N2 and the output capacitors 46-1 and 46-2 are connected in series between the output terminal 44 and the ground terminal.

To describe the second embodiment, it is also assumed that the tap M is also on the intermediate point of the secondary winding N2. When the secondary winding N2 is positive in polarity on the side of terminal A and its voltage is 2E(V), the capacitor 36-1 is charged through the diodes 42-2, 38-2, 40-2 and 42-1 to E(V) and the capacitor 36-2 through the diode 42-2 to E(V). The polarity of charged voltages in the capacitors 36-1 and 36-2 is negative on the side of terminal B of secondary winding N2. When the polarity of secondary winding N2 is reversed, the capacitors 34-1 and 34-2 are charged through the respective diodes 38-1 and 38-2 to 3E(V). The polarity of capacitors 34-1 and 34-2 is negative on the side of terminal A of secondary winding N2. When the polarity of secondary winding N2 is again reversed and becomes positive on the side of terminal A, the capacitor 36-1 is charged through the diodes 40-2 and 42-1 to 5E(V) which is the sum of voltage 2E(V) of the secondary winding N2 and of voltage 3E(V) of the capacitor 34-2. The capacitor 36-2 is charged to E(V). The capacitor 34-1 is held 2E(V) at this time. When the polarity of secondary winding N2 is further reversed and becomes positive on the side of terminal B, the capacitor 34-2 is charged up to 3E(V) and the capacitor 34-1 is charged through the diode 38-1 up to 7E(V) which is the sum of voltage 5E(V) of the capacitor 36-1 and of voltage 2E(V) of the secondary winding N2. When the polarity of secondary winding N2 is still further reversed and becomes positive on the side of terminal A, the capacitors 46-1 and 46-2 are charged through the diode 40-1 up to 8E(V) which is the sum of voltage 7E(V) of the capacitor 34-1 and the voltage E(V) between the terminal A and the tap M of secondary winding N2. The capacitor 36-1 is charged up to 5E(V) and the capacitor 36-2 is charged up to E(V) at this time. Every time when the polarity of secondary winding N2 is reversed, the process from charging the respective capacitors 34-1 and 34-2 up to 3E(V) to charging the capacitors 46-1 and 46-2 up to 8E(V) is thereafter repeated. Namely, DC voltage of 8E(V) is obtained through the output terminal 44. According to the second embodiment, output voltage four times that of the secondary winding N2 can be obtained as described above.

Since the dielectric strength of transformer is divided and charged in capacitors in the second embodiment, too, similarly to the first embodiment, the dielectric strength required for the transformer is reduced and a rectifier circuit small-sized but enabling high voltage to be obtained can be provided. Namely, when the tap M is on the intermediate point, the dielectric strength of transformer becomes E(V), the smallest, which corresponds to one eighth of the output voltage. Since the secondary winding N2 of transformer is common to two rectifier circuits, the number of windings employed can be reduced with higher reliability.

Figure 5:
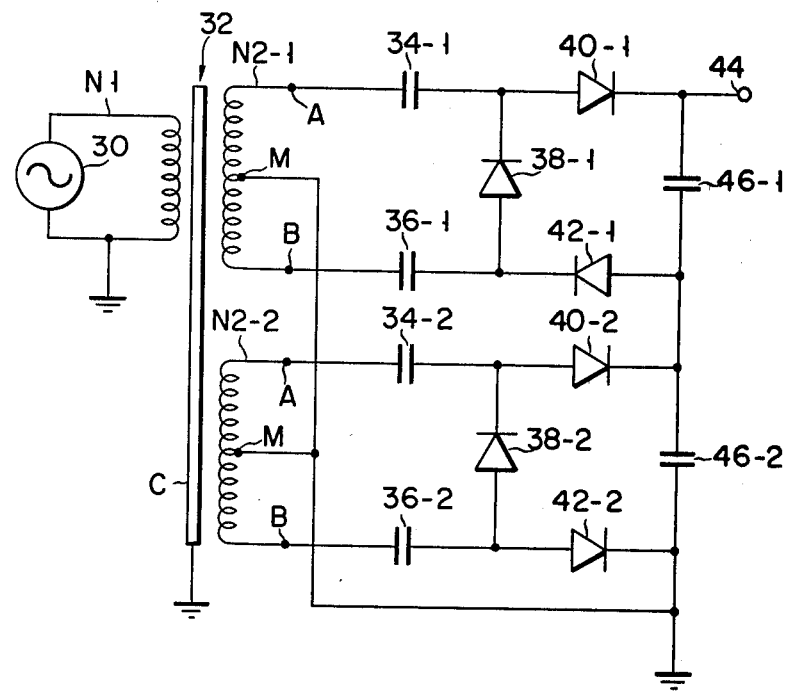
FIG. 5 is a circuit diagram showing a variation of the second embodiment shown in FIG. 4.

Similarly to the first embodiment, the tap M is not limited to the intermediate point but may be on an arbitrary point even in the second embodiment. When the tap M is on the intermediate point, relatively high voltage 7E(V) relative to output voltage 8E(V) is charged in the capacitor 34-1, which bears relatively large strength accordingly. When the position of tap M is changed, the dielectric strength of transformer 32 is raised a little but the strength of capacitor 34-1 can be lightened a little. In addition, three or more rectifier circuits may be connected parallel to the secondary winding N2. Further, different secondary windings may be arranged in rectifier circuits, respectively, as shown in FIG. 5.

Figure 6:
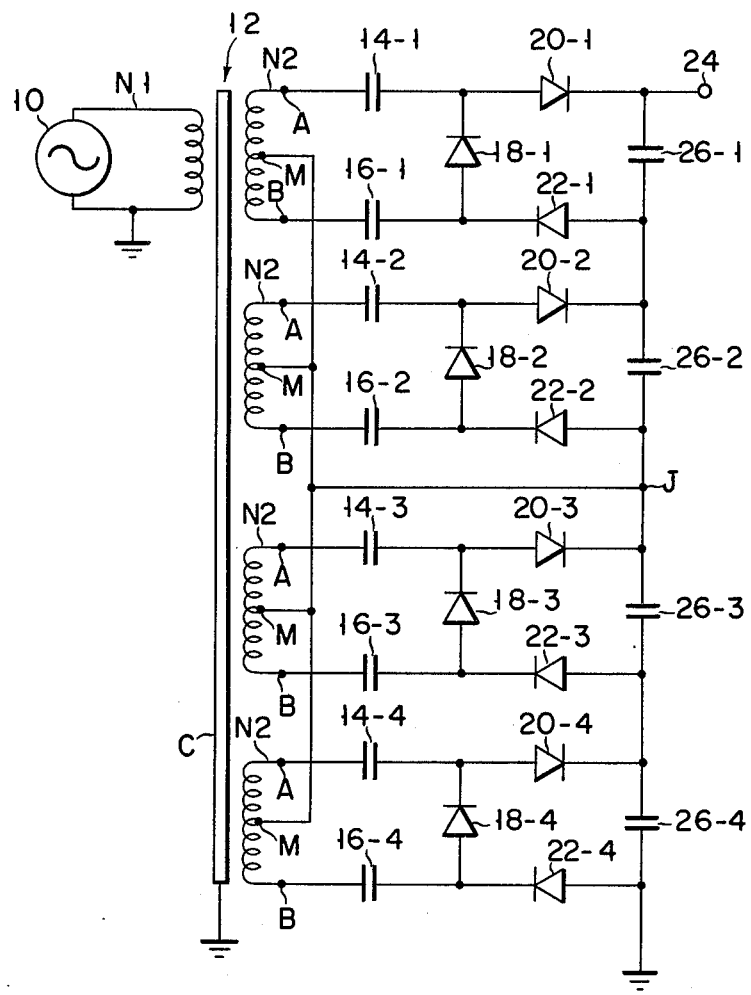
FIG. 6 is a circuit diagram showing a third embodiment of a rectifier circuit according to the present invention.

FIG. 6 is a circuit diagram showing a third embodiment of the present invention. This third embodiment comprises four voltage doubler circuits of FIG. 1, capacitors 26-1, 26-2, 26-3 and 26-4 are connected in series between an output terminal 24 and a ground terminal, and a tap M on each of secondary windings N2 of transformer is connected to a node J between the capacitors 26-2 and 26-3.

To describe the operation of the third embodiment, it is assumed that voltage 2E(V) is generated through each of the secondary windings N2 and that the tap M is on the intermediate point of each of the secondary windings N2. Let us divide the circuit into two sections at the node J between the capacitors 26-2 and 26-3. Similarly to the second embodiment, the output terminal 24 has voltage +8E(V) relative to the node J in the section between the node J and the output terminal 24. The other section between the node J and the ground terminal performs an operation in contrast with that of the upper section. Namely, capacitors 26-3 and 26-4 are positive in polarity on the side of node J and charged up to 8E(V) in total. DC voltage of 16E(V) can be obtained through the output terminal 24 accordingly.

According to the third embodiment as described above, the design free from the corona discharge becomes easy because 9E(V) in DC but only E(V) in AC is applied in maximum to each secondary winding N2. Since the tap M of each secondary winding N2 is not connected to the ground terminal but to the node between the output capacitors 26-2 and 26-3, the capacitors 14-1 and 14-3 are required to have a dielectric strength of 7E(V) only. If the tap M is grounded, the capacitor 14-1 is required to have a dielectric strength up to 15E(V). Namely, the dielectric strength of capacitors can be averaged by connecting taps M to a terminal of appropriate voltage.

The secondary winding N2 may be common to all of the voltage doubler circuits even in the third embodiment. In addition, the number of the voltage doubler circuits connected in series between the output terminal 24 and the ground terminal is not limited to those employed in above-described embodiments.

As described above, the present invention enables the transformer to have a lower dielectric strength by connecting the tap to a terminal of predetermined voltage. Therefore, the present invention can provide a rectifier circuit small-sized but through which high DC voltage can be obtained.

What we claim is:

1. A rectifier circuit comprising:
    a transformer having a primary winding for connection to an AC signal source and a secondary winding having a grounded center tap and first and second ends;
    a first capacitor having a first end connected to said first end of said secondary winding and a second end;
    a first and second rectifiers, each having first and second ends, said second end of said first rectifier and said first end of said second rectifier being coupled to said second end of said first capacitor, said first and second rectifiers being connected in series in the same rectifying direction;
    a second capacitor having a first end connected to said second end of said second rectifier and a second end;
    a third rectifier coupling said second end of said second capacitor with said first end of said first rectifier, said third rectifier being in series circuit with said first rectifier in the same rectifying direction;
    a third capacitor coupling a junction of said first and third rectifiers to said second end of said secondary winding; and
    a DC power source connected to a node between said second capacitor and said third rectifier.

2. A rectifier circuit comprising:
    a transformer having a primary winding for connection to an AC signal source and a second winding having first and second ends and a tap for connection to a predetermined voltage;
    first capacitor means including a predetermined number of first capacitors each having a first end connected to said first end of said secondary winding and a second end;
    first rectifier means having said predetermined number of first rectifiers each having a first end connected to said second end of a corresponding first capacitor and each having a second end;
    second capacitor means having said predetermined number of second capacitors, each having a first end connected to said second end of a corresponding sector rectifier and each having a second end, said second capacitors being coupled in series;
    second rectifier means including said predetermined number of second rectifiers, each second rectifier having a first end coupled to a second end of a corresponding second capacitor;
    third rectifier means including said predetermined number of third rectifiers, each having a first end coupled to a corresponding second end of a first capacitor and a second end coupled to a corresponding first end of a corresponding second rectifier; and
    third capacitor means having said predetermined number of third capacitors, each having a first end coupled to said second end of said secondary winding and a second end coupled to a first end of a corresponding second rectifier.

3. A rectifier circuit comprising:

a transformer having a primary winding for connection to an AC signal source and at least two secondary windings each having a first end, a second end, and a tap;

means for coupling each tap to the same predetermined voltage;

first capacitor means including a predetermined number of first capacitors corresponding to the number of secondary wingins, each capacitor having first and second ends, said first ends being coupled to respective first ends of said second windings;

first rectifier means including said predetermined number of said first rectifiers each having first and second ends, said first ends being coupled to said second ends of corresponding first capacitors;

second capacitor means including said predetermined number of second capacitors each having first and second ends; said first end of each of said second capacitors being coupled to said second end of a corresponding first rectifier;

second rectifier means including said predetermined number of second rectifiers each having first and second ends, the first ends thereof being coupled to respective corresponding second ends of said second capacitors;

third rectifier means including said predetermined number of third rectifiers each having first and second ends, said first end of each third rectifier being coupled to said first end of a corresponding first rectifier and second end of each third rectifier being coupled to said second end of a corresponding second rectifier; and third capacitor means including said predetermined number of third capacitors each having first and second ends, said first ends being coupled to said second ends of corresponding secondary windings and said second ends being coupled to said first ends of corresponding second rectifier; and means for coupling said second capacitor in series with one another.

4. A rectifier circuit according to claim 3, in which said taps are grounded.

5. A rectifier circuit according to claim 3, in which each of said taps is connected to a node formed at a junction between two of said second capacitors.

* * * * *